F. McLAUGHLIN.
BREAD SLICER.
APPLICATION FILED SEPT. 15, 1916.
1,211,328.
Patented Jan. 2, 1917.
2 SHEETS—SHEET 1.
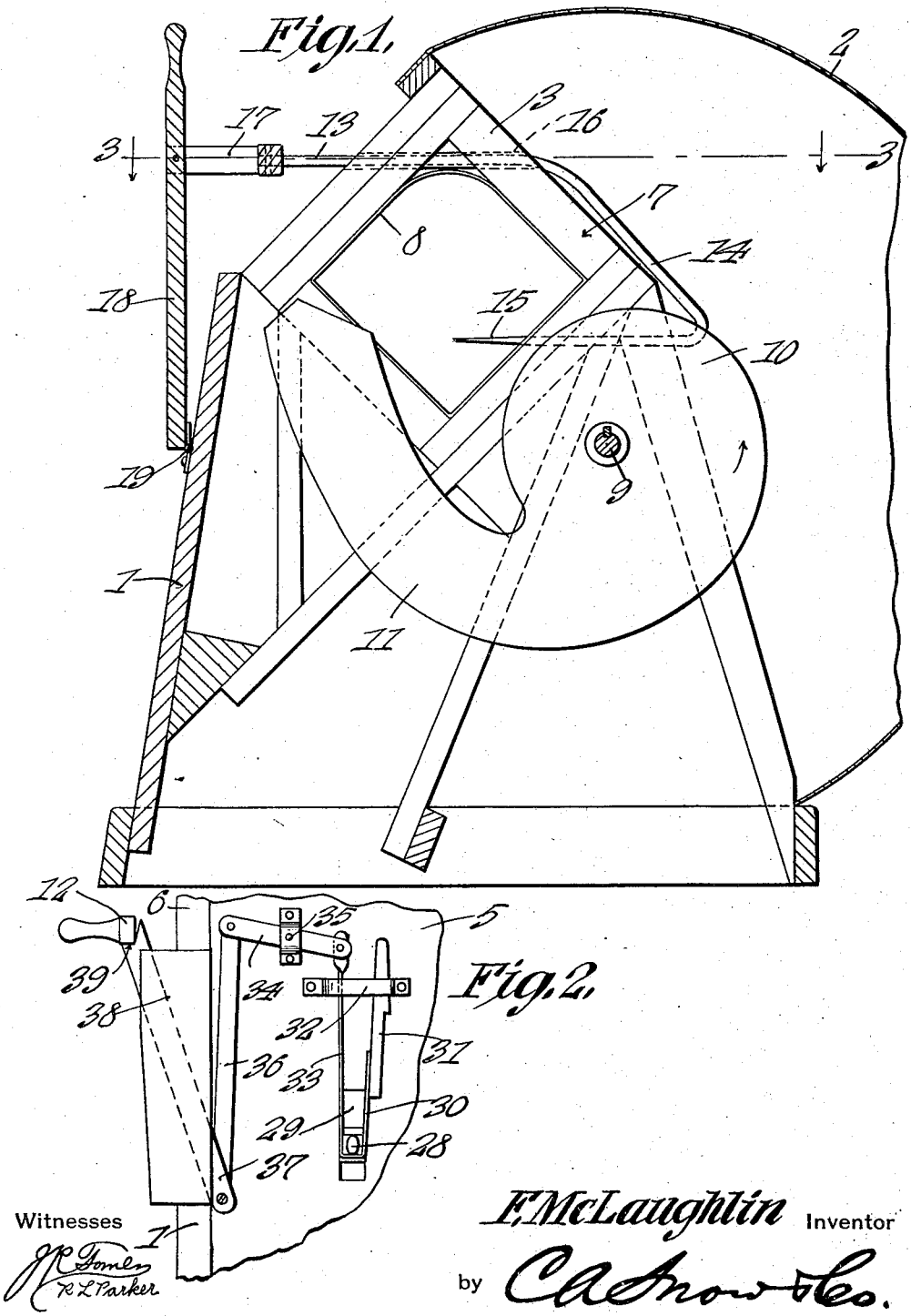
Witnesses
F. McLaughlin Inventor
by C. A. Snow & Co.
Attorneys

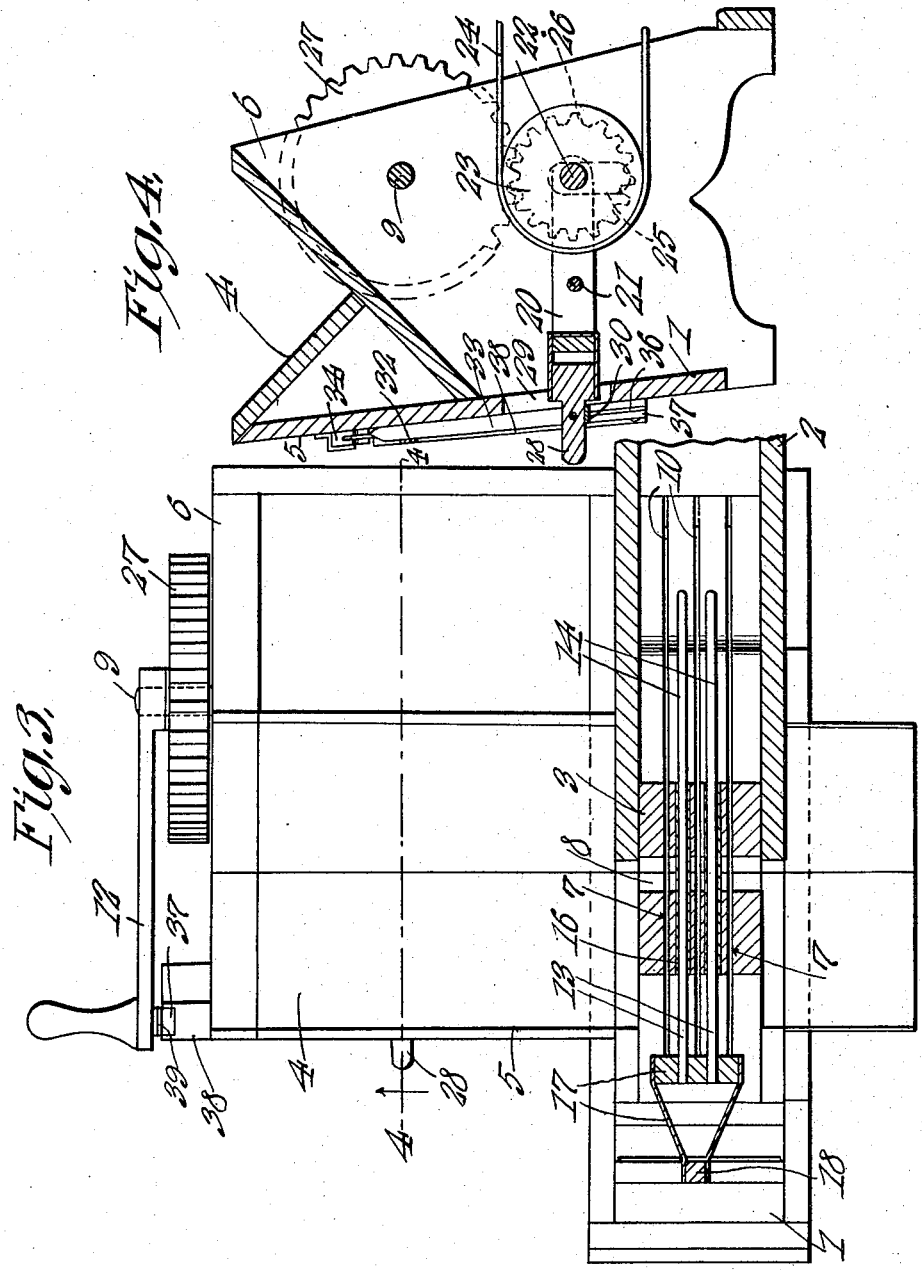

UNITED STATES PATENT OFFICE.

FRANK McLAUGHLIN, OF TEXARKANA, TEXAS.

BREAD-SLICER.

1,211,328.  Specification of Letters Patent.  Patented Jan. 2, 1917.

Application filed September 15, 1916. Serial No. 120,371.

*To all whom it may concern:*

Be it known that I, FRANK MCLAUGHLIN, a citizen of the United States, residing at Texarkana, in the county of Bowie and State of Texas, have invented a new and useful Bread-Slicer, of which the following is a specification.

The present invention appertains to slicing machines, and aims to provide a novel and improved machine for slicing bread, although it can be used for slicing cake or the like.

It is the object of the invention to provide a novel and improved bread slicer, which can be used in the kitchen or pantry for domestic purposes, or which can be used in the factory for slicing bread, for sale in sliced loaves, the machine being of novel construction to enhance the utility and efficiency thereof.

A further object of the invention is the provision in a machine of the character described, means for holding the loaf during the slicing thereof.

Another object of the invention is the provision of means, whereby if the power of a prime mover is used for operating the slicer, the driving element is disconnected from the slicing cutters at the proper time after the slices have been cut, ready for a new operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein—

Figure 1 is a vertical section of the device, portions being broken away. Fig. 2 is a fragmental elevation illustrating the device for disconnecting the driving member from the slicing cutters. Fig. 3 is a horizontal section taken on the line 3—3 of Fig. 1, portions being broken away. Fig. 4 is a vertical section taken on the line 4—4 of Fig. 3.

In carrying out the invention, there is provided a suitable frame 1 constructed of wood, metal or other material, and embodying a transverse housing or casing 2 for protecting the slicing cutters. The frame also includes a square or diamond-shaped bread receiving member 3 through which a loaf of bread can be moved, said member 3 having one diagonal line disposed horizontally and the other arranged vertically. The frame 1 has a V-shaped trough or receptacle 4 extending from the lower portion of the member 3 for receiving and holding a loaf of bread for movement through said member 3. The frame 1 also has a side plate 5 at one side of and extending downwardly from the trough 4, and an end plate at the end of and extending downwardly from the trough 4.

The member 3 is provided with slots 7 in the four portions thereof and located in parallel planes intersecting the axis of the member 3, and the member 3 is preferably provided with a lining 8 of sheet metal which is slotted similar to the member 3 for the passage of the slicing cutters.

The cutter shaft 9 is disposed longitudinally and is journaled for rotation through the central portion of the casing 2 and end plate 6, and has secured thereon within the casing 2 a plurality of slicing cutters 10 formed from flat plates of metal, and having the spiral cutting blades 11 arranged side by side. Said blades 11 are movable through the slots 7 across the opening of the member 3, for slicing the bread within the member 3 by a draw cut. The cutters 10 are rotated in the direction of the arrow in Fig. 1, and it will be noted that the cutters will move gradually into the opening of the member 3 and at the same time move across said opening to provide the draw cuts. A hand crank 12 is secured to that end of the shaft 9 which projects from the end plate 6, for manually rotating the cutters 10. Any suitable number of cutters can be provided for cutting a part of a loaf, or an entire loaf if sufficient cutters are provided.

As a means for holding the bread within the member 3 when necessary, horizontal rods or stems 13 are slidable through the upper corner portion of the member 3, and are provided within the casing 2 with portions 14 bent downwardly at an obtuse angle. Said portions 14 are provided at their lower ends with pointed spurs 15 projecting slidably through one of the lower parts of the member 3. The spurs 15 are bent back, and the upper or body portions of the rods 13 are preferably slidable within guide tubes 16 fitted within the member 3 and permitting of the rods 13 sliding easily. In order to simultaneously slide the rods 13, their outer ends are secured to a connecting member 17 which is pivoted to an upwardly projecting hand lever 18 having its lower end hinged or pivoted, as at 19, to the frame 1 at the outer side of the member 3.

When the lever 18 is swung inwardly, the rods 13 are slid inwardly, whereby to retract the spurs 15 from the opening of the member 3, thus permitting of the insertion of the loaf into the member 3, or the withdrawal of the slices therefrom. When the loaf is moved into the member 3, the lever 18 can be swung outwardly, whereby to pull the rods 13 outwardly and force the spurs 15 outwardly into the lower portion of the loaf, thereby holding said loaf during the slicing thereof. The rods 13 and their spurs 15 are located in planes between the planes of the slots 7, so that there will be no interference between the cutters and bread holding spurs 15. In some cases, the bread holding means is not necessary, and need not be used.

If power from a motor, engine or other prime mover is available for operating the slicing cutters, then the operator can be relieved of this duty, especially when considerable work is to be done. For this purpose, a lever or bearing bracket 20 is fulcrumed within the frame 1, as at 21, and carries a counter shaft 22 upon which a pulley wheel 23 is keyed, said pulley wheel 23 being connected by a belt 24 or otherwise with the prime mover, whereby the shaft 22 can be rotated continuously during the operation of the machine. The shaft 22 extends through an opening or slot 25 with which the end plate 6 is provided, and has secured upon its protruding end a gear wheel or pinion 26 below a gear wheel 27 keyed upon the protruding end of the shaft 9 adjacent to the hand crank 12. When the lever 20 is swung, the pinion 26 is moved into and out of engagement with the gear wheel 27 for connecting and disconnecting the driving shaft 22 with and from the shaft 9, respectively. One arm of the lever 20 carries the shaft 22, and the other arm has a handle 28 projecting through a vertical slot 29 in the side plate 5, and an upwardly projecting leaf spring 30 is secured to the handle 28 and carries a catch 31 working in a guide strap 32 attached to the plate 5 at the upper end of the slot 29. A vertical link 33 extending through the guide strap 32 has its lower end connected to the handle 28 and its upper end pivoted to a lever 34 fulcrumed to the plate 5, as at 35. A link 36 has its upper end pivotally connected to the other arm of the lever 34 and has its lower end pivoted to the lower end of an inclined or oblique thrust or operating bar 37 slidable through a guide 38 carried by the frame 1. The upper protruding end of the bar 37 has a notch 39 for the engagement of the crank 12, said crank being so located that when it strikes the notched end 39 of the bar 37, the cutting blades 11 are removed from the opening of the member 3, as seen in Fig. 1.

Supposing that the shaft 22 is connected to a prime mover to be operated continuously during the operation of the machine, after the loaf of bread is properly placed within the member 3, the operator releases the catch 31 from the guide 32, and swings the handle 28 downwardly, the crank 12 having passed the bar 37 so that it can turn with the shaft 9. When the handle 28 is thus depressed, the shaft 22 is raised to bring the pinion 26 into mesh with the gear wheel 27, whereby the gear wheel 27 and shaft 9 will be rotated to actuate the slicing cutters. When the handle 28 is lowered, the bar 37 is moved upwardly through the medium of the links 33 and 36 and lever 34, to bring the notched end 39 of said bar into the path of the crank 12. After the cutters have made a complete revolution and reached the position shown in Fig. 1, the crank 12 strikes the notched end 39 of the bar 37, and forces said bar downwardly, thereby raising the handle 28 and bringing the catch 31 into position to snap into engagement with the strap 32 for holding the handle 28 raised. When the handle 28 is so raised, the lever 20 is swung to remove the pinion 26 from the gear wheel 27, thus disconnecting the driving member from the cutters, and stopping the cutters, to prevent an excessive movement thereof. The cutters are thus stopped at the proper time, to permit of the removal of the slices and the insertion of the unsliced portion of the loaf into the member 3. When the member or bar 37 is moved downwardly, it enables the crank 12 to clear said bar 37 for the next operation, which is set in motion by releasing the catch 31 and moving the handle 28 downwardly as before.

The present device can be constructed in various sizes for domestic use or for use in a bakery or factory. The device can be constructed of a size to slice an entire loaf of bread at one time, whereby the loaf can be wrapped with the slices resting together to retain the moisture. The sliced loaves will dispense with the necessity of the purchaser slicing the bread, and the slices can be cut uniform. The device has other advantages which will be apparent from the foregoing.

Having thus described the invention, what is claimed as new is:

1. A bread slicer embodying a bread receiving member of substantially square form having its diagonal lines arranged horizontally and vertically, said member having slots in parallel planes, a rotatable shaft at one side of said member, slicing cutters carried by the shaft and having spiral blades to pass through said slots, spurs slidable through said member between the slots, and means for simultaneously moving said spurs to project and retract them.

2. A bread slicer embodying a bread receiving member of substantially square form having its diagonal lines arranged horizontally and vertically, said member having slots in parallel planes, a rotatable shaft at one side of said member, slicing cutters carried by said shaft and having spiral blades to pass through said slots, rods slidable through the upper portion of said member and having bent back portions providing spurs slidable through one portion of said member adjacent to said shaft, and means for sliding said rod simultaneously to project and retract said spurs.

3. In a slicing machine, a rotatable shaft, a slicing cutter operated thereby, a member rotated by said shaft, a driving shaft, means for connecting said shafts, an oblique sliding member controlling the connecting means and arranged in the path of movement of the first mentioned member to be moved thereby for connecting the shafts, and means for holding the shafts connected and releasable manually.

4. In a slicing machine, a rotatable shaft, a slicing cutter carried thereby, a gear wheel carried by said shaft, a member connected to said shaft, a lever, a driving shaft carried by said lever, a pinion carried by the driving shaft for movement into and out of engagement with said gear wheel, an oblique sliding bar connected to said lever and having one end arranged in the path of the first mentioned member when the lever is swung to bring the pinion into engagement with said gear wheel, said bar in being moved by the first mentioned member serving to swing the lever to move the pinion out of engagement with said gear wheel, and a catch for holding the lever when moved to the last mentioned position.

In testimony that I claim the foregoing as my own, I have hereto affixed my signature in the presence of two witnesses.

FRANK McLAUGHLIN.

Witnesses:
J. B. BULLARD,
W. I. HARRISON.

Copies of this patent may be obtained for five cents each, by addressing the "Commissioner of Patents, Washington, D. C."